March 1, 1927.  
W. BARTELS  
1,619,395  
TOOL  
Filed Oct. 16, 1925
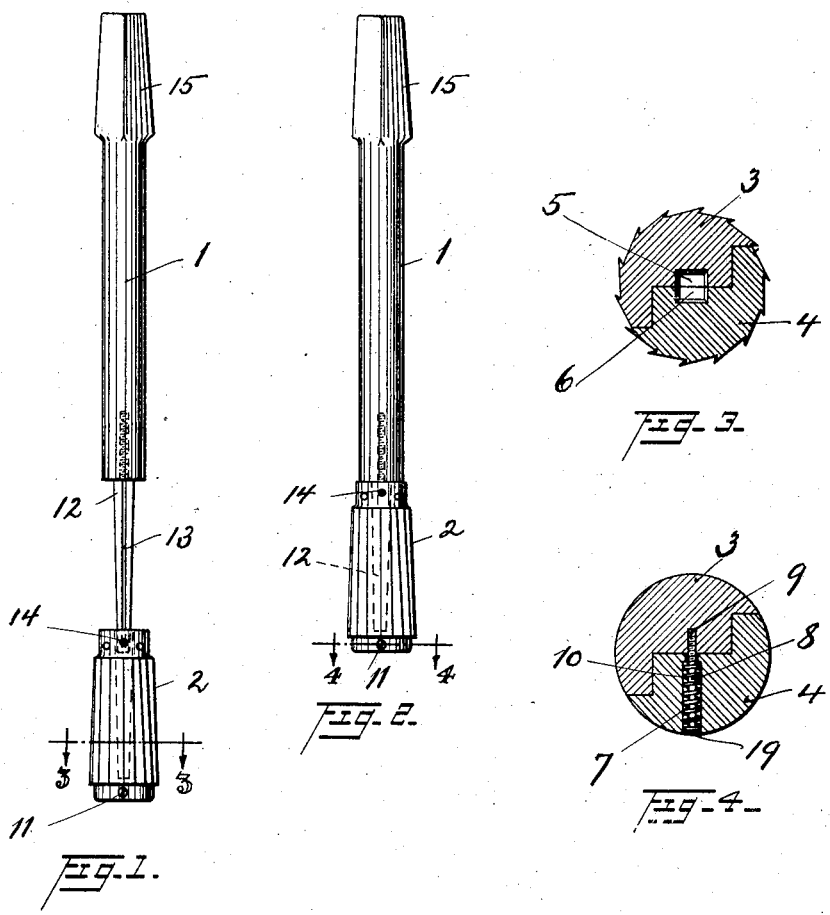
INVENTOR.  
William Bartels  
BY  
ATTORNEY.

Patented Mar. 1, 1927.

1,619,395

UNITED STATES PATENT OFFICE.

WILLIAM BARTELS, OF NEW YORK, N. Y.

TOOL.

Application filed October 16, 1925. Serial No. 62,904.

My invention has reference to tools, and more particularly to tools to which a rotary motion is applied, such as reamers, and drills, etc.

The object of my invention is to produce a tool of which the operating member or tool-head is made of two or more separate parts fitted to each other, and adapted to be spread apart, whereby the tool-head is expanded. The separate parts of the tool-head are yieldingly held together, so that normally their inner faces will lie against each other.

The means for spreading the parts of the tool-head apart is carried by the tool shaft being detachably secured thereto, so that it can be exchanged for one of larger or smaller sizes. In this manner, several degrees of expansion of the tool-head can be obtained.

In the drawing, in which I have illustrated my invention by way of example, Fig. 1 shows in elevation a tool comprising a shaft and a spiral fluted reamer, the two portions of the tool being shown partially disconnected. Fig. 2 is a similar view as Fig. 1 showing the shaft and the reamer connected, Fig. 3 is a cross-section along line 3—3 in Fig. 1, and Fig. 4 is a cross-section along line 4—4 in Fig. 2.

1 is the tool shaft and 2 the tool-head, which in the example shown is a spiral fluted reamer. This tool-head as will be seen from Figs. 3 and 4 consists of two separate parts 3, 4 each provided with a plurality of inner faces of step-wise formation. These faces, as shown are exactly fitted to each other.

In the central inner face of each of the parts 3, 4 is cut an angular tapering groove 5 and 6 respectively, which grooves in the position of the two parts 3, 4 shown in Fig. 4 register with each other forming a tapering angular (square) hole. Through a bore 7 provided in the part 4, near the outward end thereof, passes a screw stud 8 which, with its threaded portion 9 enters a threaded hole in the part 3. The smooth stem of the stud 8 is encircled by a helical spring 10 bearing against a shoulder in the part 4 and against the head 11 of the stud 8.

In the shaft 1 is detachably secured, by screw-threads or otherwise, a tapering angular stem 12 which, when pushed into the tapering hole formed by the grooves 5 and 6 in the parts 3 and 4, spreads said parts apart so that the tool-head 2 thereby becomes expanded, the fullest expansion being obtained when the stem 12 is pushed into the said hole to its entire length.

Obviously, as the parts 3 and 4 are thus spread apart, the helical spring 10 surrounding the stem 7 of the screw stud 8 thereby becomes compressed, so that when the stem 12 is again withdrawn from the above said hole, the parts 3 and 4 of the tool-head are moved by the previously compressed spring 10 towards each other, occupying the closed position shown in Figs. 3 and 4.

In the stem 12 are provided on opposite sides thereof narrow longitudinal grooves 13 extending to near the free end of said stem. In the tool-head 2, near its inner end are provided small set screws 14, on opposite sides of the tool-head, which set screws are adapted to engage the narrow grooves 13, so that on withdrawing the stem 12 from the hole formed by the recesses 5 and 6 in the parts 3 and 4 of the tool-head, the stem 12 and the tool-head are not completely separated.

As stem 12 is detachably secured to the shaft 1, the stem can, of course, be easily removed from the shaft and can be replaced by a stem of either a larger or smaller size or cross-section. In order to release the stem 12 from the tool-head 2, it is only necessary to slightly unscrew the set screws 14.

By thus making stem 12 exchangeable, I can use with the same tool-head stems of various cross-sections, and I am thus enabled to use the same tool-head for holes or the like of various dimensions.

The shaft 1 is provided with the usual square portion 15, whereby it can be secured in a brace or other suitable tool holder.

Obviously, various changes can be made in the tool as shown—for instance, the tool-head, instead of comprising two parts, may comprise three or more parts—and therefore, I wish it to be understood that I do not limit myself to the embodiment of my invention as shown on the drawing.

I claim as my invention:

1. In a tool, the combination with the tool shaft, of a tool-head comprising separate parts fitted to each other and adapted to operatively engage the work, a means yieldingly resiliently connecting said parts, and a means for separating said parts throughout their lengths so as to expand the tool-head.

2. In a tool, the combination with the tool shaft, of a tool-head comprising two separate parts fitted to each other and adapted to operatively engage the work, a threaded pin extending through the one part and engaging the other part, a helical spring surrounding said pin, and a means for separating said parts along said pin against the action of said spring so as to expand the tool-head.

3. In a tool, the combination with the tool shaft, of a tool-head comprising two separate parts fitted to each other, means for yieldingly holding said parts together, said parts having each a tapering recess extending almost throughout their lengths adapted to register with each other so as to form a tapering hole, and a tapering stem carried by said tool shaft and adapted to enter said tapering hole so as to spread said parts apart thereby expanding the tool-head.

4. In a tool, the combination with the tool shaft, of a tool-head comprising two separate parts fitted to each other, means for yieldingly holding said parts together, said parts each having a tapering angular recess adapted to register with each other and form a tapering angular hole, and a tapered angular stem detachably secured in said tool shaft and adapted to enter said tapering hole so as to spread said parts apart thereby expanding the tool-head.

5. In a tool, the combination with the tool shaft, of a tool-head comprising two separate parts provided with a plurality of faces adapted to engage, and bear against, each other, means for yieldingly holding said parts together, said parts each having a tapering angular recess adapted to register with each other and form a tapering angular hole, a tapered angular stem detachably secured in said tool shaft and adapted to enter said tapering hole so as to spread said parts apart thereby expanding the tool-head, and a means for retaining said stem in said tool-head.

6. In a tool, the combination with the tool shaft, of a tool-head comprising two separate parts fitted to each other, means for yieldingly holding said parts together, said parts each having a tapering angular recess adapted to register with each other and form a tapering angular hole, and a tapered angular stem detachably secured in said tool shaft and adapted to enter said tapering hole so as to spread said parts apart thereby expanding the tool-head, said tapering stem having longitudinal grooves extending to near the end of said stem, and removable studs in said tool-head adapted to enter said grooves.

7. In a tool, the combination with the tool shaft, of a tool-head comprising a plurality of separate parts fitted to each other, means for yieldingly holding said parts together, said parts each having a tapering recess adapted to register with each other and form a tapering hole, and a tapered stem detachably secured in said tool shaft and adapted to enter said tapering hole so as to spread said parts apart throughout their lengths thereby expanding the tool-head.

8. In a tool, the combination with the tool shaft, of a tool-head comprising a plurality of separate parts fitted to each other, means for yieldingly holding said parts together in parallel relation, said parts each having a tapering recess adapted to register with each other and form a tapering hole, and a tapered stem detachably secured in said tool shaft and adapted to enter said tapering hole so as to spread said parts apart thereby expanding the tool-head, and means in said stem and said tool-head for retaining said stem in said tool-head.

In testimony whereof I affix my signature.

WILLIAM BARTELS.